United States Patent
Yazawa et al.

(10) Patent No.: US 6,734,233 B2
(45) Date of Patent: May 11, 2004

(54) SOLID ADHESIVE COMPOSITION

(75) Inventors: Suguru Yazawa, Tano-gun (JP); Takahiro Osada, Sawa-gun (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/168,622

(22) PCT Filed: Dec. 26, 2000

(86) PCT No.: PCT/JP00/09263

§ 371 (c)(1), (2), (4) Date: Jun. 24, 2002

(87) PCT Pub. No.: WO01/48112

PCT Pub. Date: Jul. 5, 2001

(65) Prior Publication Data

US 2003/0004255 A1 Jan. 2, 2003

(30) Foreign Application Priority Data

Dec. 27, 1999 (JP) ............................................. 11-370568

(51) Int. Cl.[7] .............................. C08K 5/01; C08K 5/52; C08L 91/08

(52) U.S. Cl. ......................... 524/62; 524/19; 524/140; 524/310; 524/487; 524/488

(58) Field of Search ........................... 524/19, 62, 140, 524/310, 487, 488

(56) References Cited

FOREIGN PATENT DOCUMENTS

| EP | 562 192 A1 | 9/1993 |
|---|---|---|
| JP | 53-067739 | 6/1978 |
| JP | 53-42343 | 11/1978 |
| JP | 61-293276 A | 12/1986 |
| JP | 4-337381 A | 11/1992 |
| JP | 9-151365 A | 6/1997 |
| JP | 10-176153 A | 6/1998 |

*Primary Examiner*—Kriellion A. Sanders
(74) *Attorney, Agent, or Firm*—Burns, Doane, Swecker & Mathis, LLP

(57) ABSTRACT

A solid adhesive composition which has an excellent applying performance even after an applying part of the solid adhesive is left to stand in the atmosphere for a long time and which is excellent in a cap-off performance and which comprises at least an adhesive component, a gelling agent and a solvent, wherein contained in the above composition are at least one selected from the group consisting of waxes such as paraffin waxes and olefin waxes which are a solid at room temperature and have a solubility of 20% or less in the solvent at room temperature and/or a substance absorbing moisture contained at least in the atmosphere and/or the adhesive composition to form an evaporation-inhibiting film.

16 Claims, 1 Drawing Sheet

SOLID ADHESIVE COMPOSITION

TECHNICAL FIELD

The present invention relates to a solid adhesive composition having an excellent applying performance even after an applying part of the solid adhesive is left to stand in the atmosphere for a long time.

BACKGROUND ART

Conventional solid adhesive compositions such as solid pastes have such a defect that if they are left in a cap-off state, the solvents evaporate, and the adhesive resins contained in the pastes are solidified on the surface layer of the applying part, so that the pastes are less liable to be applied when used next time.

In order to avoid this state, it has so far been tried to add scarcely-volatile solvents or change the composition of an adhesive resin, but the problem therewith is that a drying time for an applied paste is extended or the adhesive strength is lowered.

Disclosed in Japanese Patent Application Laid-Open No. Sho 53-42343 and Japanese Patent Application Laid-Open No. Sho 53-67739 are adhesive compositions suited particularly to flooring materials, for example, vinyl chloride-made tiles which are improved in an adhering workability by blending organic solvent solutions of vinyl acetate base polymers with glycerin monostearate, diglycerin monostearate and diglycerin distearate to extend open time (time spent until stuck together after applied and left uncovered) in Japanese Patent Application Laid-Open No. Sho 53-42343 and usable time (time spent until it becomes impossible to use adhesives from the time of preparing them) in Japanese Patent Application Laid-Open No. Sho 53-67739.

However, the adhesives disclosed in these official gazettes are adhesives of a solution type prepared by dissolving vinyl acetate base polymers in organic solvents.

On the other hand, disclosed in Japanese Patent Application Laid-Open No. Sho 61-293276 are solid pastes for office uses prepared by mixing 60 to 100 parts by weight of resins such as petroleum resins and natural resins with 100 parts by weight of waxes such as paraffin, stearic acid, carnauba wax and low molecular weight polyethylene wax using plasticizers such as dioctyl phthalate and dibutyl phthalate in combination therewith.

However, in the solid pastes for office uses disclosed in this official gazette, solvents and water are avoided being blended in order to remove a factor of losing the adhesive function caused by evaporation of the solvents and water. In addition thereto, it is positively disclosed that wax is used as a base material.

In light of the problems of the conventional techniques described above, the present invention intends to solve them, and an object of the present invention is to provide a solid adhesive composition having an excellent applying performance even after an applying part of the solid adhesive is left to stand in the atmosphere for a long time.

DISCLOSURE OF THE INVENTION

Intensive investigations of the problems on the conventional techniques described above repeated by the present inventors have resulted in finding that a solid adhesive composition meeting the object described above can be obtained by adding a specific substance to a solid adhesive composition containing at least an adhesive component, a gelling agent and a solvent, and the present invention has come to be completed.

That is, the solid adhesive composition of the present invention comprises the following items (1) to (8).

(1) A solid adhesive composition comprising at least an adhesive component, a gelling agent and a solvent, wherein contained in the above composition is at least one selected from the group consisting of waxes which are a solid at room temperature and have a solubility of 20% or less in the solvent at room temperature.

(2) A solid adhesive composition having an excellent cap-off performance, comprising at least an adhesive component, a gelling agent and a solvent, wherein contained in the above composition is a substance absorbing moisture contained at least in the atmosphere and/or the adhesive composition to form an evaporation-inhibiting film.

(3) A solid adhesive composition comprising at least an adhesive component, a gelling agent and a solvent, wherein contained in the above composition are at least one selected from the group consisting of waxes which are a solid at room temperature and have a solubility of 20% or less in the solvent at room temperature and a substance absorbing moisture contained at least in the atmosphere and/or the adhesive composition to form an evaporation-inhibiting film.

(4) The solid adhesive composition as described in the above item (1) or (3), wherein the waxes which are a solid at room temperature and have a solubility of 20% or less in the solvent at room temperature are at least one selected from the group consisting of paraffin waxes, olefin waxes, microcrystalline waxes, petrolatum, animal waxes, vegetable waxes, mineral waxes, polyethylene waxes and Fisher.Tropsch waxes.

(5) The solid adhesive composition as described in the above item (2) or (3), wherein the substance absorbing moisture contained at least in the atmosphere and/or the adhesive composition to form an evaporation-inhibiting film is at least one selected from the group consisting of glycerin fatty acid esters, polyglycerin fatty acid esters, alkyl phosphates, polyoxyalkylene fatty acid esters, sorbitan fatty acid esters, polyoxyalkylene sorbitan fatty acid esters, sorbit fatty acid esters, polyoxyalkylene sorbit fatty acid esters and lecithin.

(6) The solid adhesive composition as described in the above item (1) or (4), wherein the waxes have a content of 0.1 to 15% by weight based on the total amount of the composition.

(7) The solid adhesive composition as described in the above item (2) or (5), wherein the substance absorbing moisture contained at least in the atmosphere and/or the adhesive composition to form an evaporation-inhibiting film has a content of 0.01 to 10% by weight based on the total amount of the composition.

(8) The solid adhesive composition as described in any of the above items (3) to (5), wherein a content ratio of the waxes to the substance absorbing moisture contained at least in the atmosphere and/or the adhesive composition to form an evaporation-inhibiting film is 1/1 to 100/1 in terms of a weight ratio, and the total content thereof is 0.1 to 10% by weight based on the total amount of the composition.

BEST MODE FOR CARRYING OUT THE INVENTION

Figure 1:
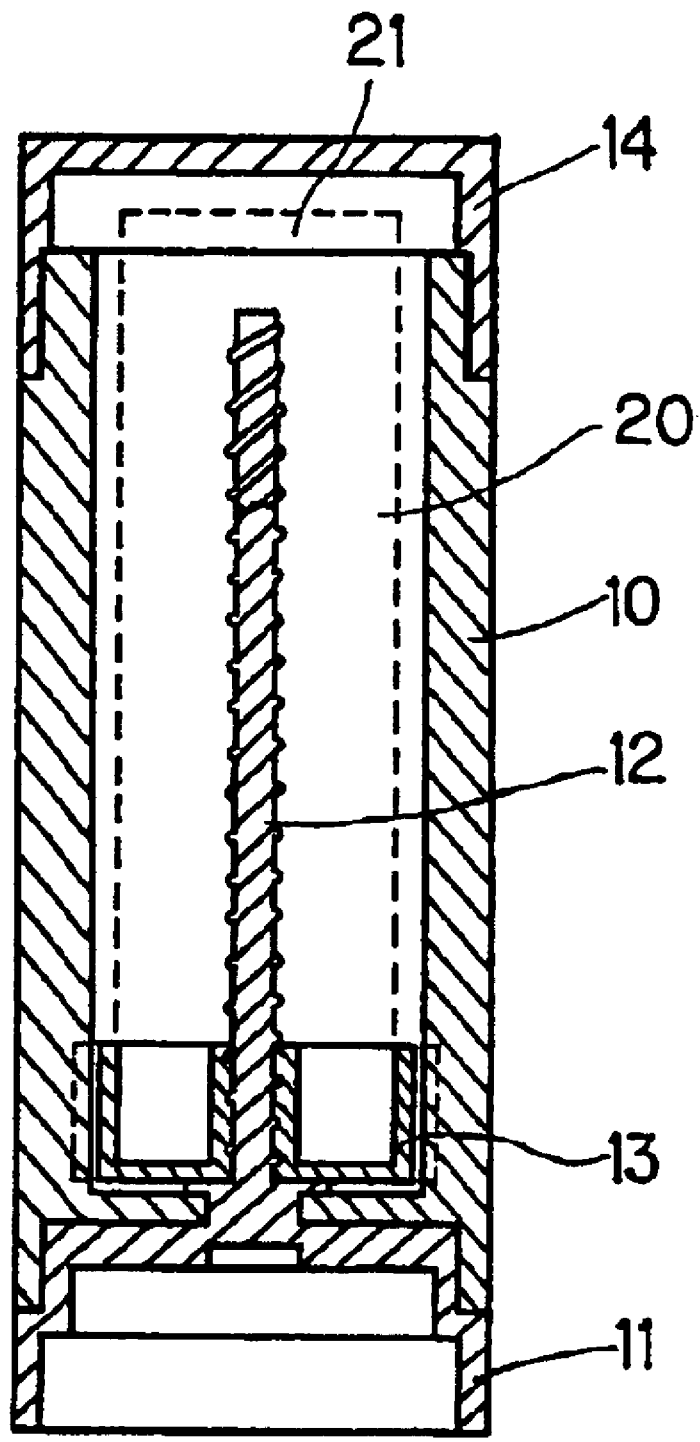
FIG. 1 is a cross section showing one example of a use state of the solid adhesive composition of the present invention.

The embodiments of the present invention shall be explained below in details.

The solid adhesive composition in the first embodiment of the present invention is a solid adhesive composition comprising at least an adhesive component, a gelling agent and a solvent, wherein contained in the above composition is at least one selected from the group consisting of waxes which are a solid at room temperature and have a solubility of 20% or less in the solvent at room temperature. In the second embodiment, a substance absorbing moisture contained at least one in the atmosphere and/or the adhesive composition to form an evaporation-inhibiting film is contained in the composition described above comprising at least an adhesive component, a gelling agent and a solvent. In the third embodiment, contained in the composition described above are at least one selected from the group consisting of waxes which are a solid at room temperature and have a solubility of 20% or less in the solvent at room temperature and a substance absorbing moisture contained at least in the atmosphere and/or the adhesive composition to form an evaporation-inhibiting film.

The adhesive components used in the first to third embodiments (hereinafter referred to merely as "embodiment") of the present invention shall not specifically be restricted, and adhesive components which have so far been used for solid adhesives can be used. They include, for example, synthetic resins such as polyvinylpyrrolidone, polyvinyl alcohol, polyacrylates, polymethacrylates, polyvinyl acetate and polyvinylbutyral each having an average molecular weight of 10,000 to 3,000,000, celluloses such as methyl cellulose and ethyl cellulose and natural resins such as starch, gelatin and corn starch. They can be used alone or in a mixture of two or more kinds thereof, and a content thereof is 5 to 50% by weight, preferably 10 to 40% by weight based on the total amount of the composition.

The gelling agent used in the embodiment of the present invention shall not specifically be restricted, and gelling agents which have so far been used for solid adhesives can be used. They include, for example, condensation products obtained by condensing benzaldehyde with tetra- to hexahydric aliphatic polyhydric alcohols, such as sorbit.benzaldehyde condensation products and xylit.benzaldehyde condensation products, alkali metal salts or ammonium salts of fatty acids having 8 to 36 carbon atoms, N-lauroyl-glutamic acid-α, γ-di-n-butyramide, dextrin fatty acid esters, fatty acid amides, organic bentonite, aluminum silicate and silica. They can be used alone or in a mixture of two or more kinds thereof.

The gelling agent has a content of 0.1 to 15% by weight, preferably 1 to 10% by weight based on the total amount of the composition.

The solvent used in the embodiment of the present invention shall not specifically be restricted, and solvents which have so far been used for solid adhesives can be used. They include, for example, lower alcohols such as ethyl alcohol, propyl alcohol and isopropyl alcohol, aromatic hydrocarbons such as toluene and xylene, lower aliphatic ketones such as methyl ethyl ketone and methyl isobutyl ketone, esters of a lower alcohol with a lower fatty acid such as ethyl acetate and butyl acetate, aliphatic hydrocarbons such as hexane and heptane, alicyclic hydrocarbons such as cyclohexane and ethylcyclohexane and glycol ethers such as propylene glycol monomethyl ether and propylene glycol monoethyl ether. They can be used alone or in a mixture of two or more kinds thereof, and a content thereof is 30 to 90% by weight, preferably 40 to 70% by weight based on the total amount of the composition.

The solvent described above may be a mixture of water and a solvent. A moisture content in the solid adhesive composition is preferably 0.1 to 15% by weight, more preferably 1.0 to 10% by weight based on the total amount of the composition in terms of sufficiently exhibiting the effect of the present invention that the solid adhesive composition of the present invention has an excellent applying performance even after it is left to stand in the atmosphere for a long time.

If the moisture content is less than 0.1% by weight, the effects of the present invention can not be exhibited. On the other hand, if it exceeds 15% by weight, reduction in the adhesive performance is caused because of deterioration in the drying property. Accordingly, neither are preferred.

The waxes used in the first and third embodiments of the present invention are a solid at room temperature (25° C., hereinafter the same shall apply) and have a solubility of 20% or less, preferably 10% or less and more preferably 5% or less in the solvent at room temperature. The lower limit value thereof includes 0% and is preferably 0.1% or more, more preferably 1% or more.

The waxes exhibiting this solubility characteristic include, for example, waxes such as paraffin waxes, olefin waxes, microcrystalline waxes, petrolatum, animal waxes, vegetable waxes, mineral waxes, polyethylene waxes and Fisher.Tropsch waxes, and they can be used alone or in a mixture of two or more kinds thereof.

Waxes which are a liquid at room temperature or those which have a solubility exceeding 20% in the solvent at room temperature are eluted in the solvent by virtue of dissolution or diffusion action, and the effect of the present invention is lowered during storage over a long period of time or the effect is lost as the solid adhesive composition is used, so that the objects of the present invention can not be achieved.

A solubility of 20% or less in the solvents described above means that the waxes have a solubility of 20% or less in the solvents used in the present invention at room temperature.

The waxes satisfying the solubility described above have preferably a melting point (mp) of 35 to 75° C. in order to achieve further effects of the present invention.

The waxes in the first embodiment have a content of 0.1 to 15% by weight, preferably 1.0 to 10% by weight based on the total amount of the composition.

If the waxes have a content of less than 0.1% by weight, the effects of the present invention can not be exhibited. On the other hand, if it exceeds 15% by weight, the adhesive performance is reduced, and cohesive failure takes place. Accordingly, neither are preferred.

The substance, which is used in the second and third embodiments of the present invention, absorbing moisture contained at least in the atmosphere and/or the adhesive composition to form an evaporation-inhibiting film is one or a mixture of two or more selected from the group consisting of glycerin fatty acid esters such as glycerin monostearate, glycerin distearate, glycerin monooleate and glycerin monolaurate, polyglycerin fatty acid esters such as diglycerin monostearate, triglycerin monostearate, pentaglycerin distearate, hexaglycerin tristearate and decaglycerin distearate, alkyl phosphates such as polyoxyethylenestearyl phosphate, polyoxyalkylene fatty acid esters such as polyoxyethylene monostearate, polyoxyethylene distearate, polyoxyethylene monolaurate and polyoxyethylene monooleate, sorbitan fatty acid esters such as sorbitan monostearate and sorbitan tristearate, polyoxyethylene sorbitan fatty acid esters such as polyoxyethylene sorbitan monostearate and polyoxyethylene sorbitan tristearate, sorbit fatty acid esters such as sorbit distearate and sorbit tristearate, polyoxyethylene sorbit fatty acid esters such as polyoxyethylene sorbit hexastearate, pentaerythritol derivatives such as pentaerythritol monostearate and pentaerythritol distearate, lecithin, sucrose esters, stearyl ascorbate and sorbitan stearate.

The substances which are a solid at room temperature and have a solubility of 10% or less in the solvent is preferred in terms of a degree of easiness in forming the film and a degree of quickness in the film-forming time.

The substance forming an evaporation-inhibiting film in the second embodiment has a content of 0.01 to 10% by weight, preferably 0.03 to 5% by weight based on the total amount of the composition.

If this substance forming an evaporation-inhibiting film has a content of less than 0.01% by weight, the effects of the present invention can not be exhibited. On the other hand, if it exceeds 10% by weight, the adhesive performance is reduced, and cohesive failure takes place. Accordingly, neither are preferred.

In the third embodiment of the present invention, in the solid adhesive composition comprising at least the adhesive component, the gelling agent and the solvent, used in combination in the above composition are two components which are at least one selected from the group consisting of waxes such as paraffin waxes and olefin waxes which are a solid at room temperature and have a solubility of 20% or less in the solvent at room temperature and a substance absorbing moisture contained at least in the atmosphere and/or the adhesive composition to form an evaporation-inhibiting film, and a content ratio of the waxes to the substance forming an evaporation-inhibiting film and the total content thereof are controlled to the specific ranges, whereby capable of being prepared is the solid adhesive composition exhibiting an excellent applying performance for a further longer time as compared with the compositions in which the above two components each are added alone in the first and second embodiments described above.

A content ratio [(A)/(B)] of the waxes (A) to the substance (B) absorbing moisture contained at least in the atmosphere and/or the adhesive composition to form an evaporation-inhibiting film is 1/1 to 100/1, preferably 2/1 to 50/1 in terms of a weight ratio, and the total content thereof is 0.1 to 10% by weight, preferably 1 to 5% by weight based on the total amount of the composition.

If a content ratio [(A)/(B)] of the waxes (A) to the substance (B) forming an evaporation-inhibiting film falls outside a range of 1/1 to 100/1 in terms of a weight ratio or the total content thereof falls outside a range of 0.1 to 10% by weight, further effects brought about by combined use of the two components can not be obtained.

Further, in the present invention, capable of being added as additives for the solid adhesive composition are various additives which have so far been used for solid adhesive compositions, for example, water, colorants, perfumes, fungicides, lubricants, wetting agents, extenders and antiseptics.

The solid adhesive composition of the present invention can be produced by stirring and mixing the adhesive component, the gelling agent, the solvent, various kinds of the waxes and/or various kinds of the substances forming an evaporation-inhibiting film each described above by a conventional method, leaving the mixture to be cooled and solidified.

In the present invention, capable of being achieved is the solid adhesive composition having an excellent applying performance even after an applying part of the solid adhesive is left to stand in the atmosphere for a long time. In particular, when it is applied to a feeding vessel (stick type) equipped with a cap shown in FIG. 1, capable of being achieved is the solid adhesive composition having an excellent cap-off performance which exhibits an excellent applying performance even after the cap is detached to leave an applying part of the solid adhesive to stand in the atmosphere for a long time.

To briefly explain the feeding vessel (stick type) equipped with a cap shown in FIG. 1 in which the solid adhesive composition is loaded, 10 is a vessel body; 11 is a rotating part; 12 is a screw bar; 13 is a pan for receiving a solid adhesive composition 20; and 14 is a cap. In applying, the cap 14 is detached, and the rotating part 11 is rotated, whereby the pan 13 goes upward by screwing action with the screw bar, and this allows an applying part 21 at a tip of the solid adhesive composition 20 to go upward to be used for applying. When retracting it, the pan goes downward by rotating the rotating part 11 in a direction inverse to that in applying as described above, and the solid adhesive composition 20 is retracted in the vessel body 10.

Inferred as follows is a reason why the solid adhesive composition of the present invention has an excellent applying performance even after an applying part of the solid adhesive is left to stand in the atmosphere for a long time. However, the action mechanisms in the respective embodiments are a little different in a function thereof as described later.

In the solid adhesive composition prepared by adding various kinds of the waxes exhibiting the solubility characteristic described above to the solid adhesive composition comprising at least the adhesive component, the gelling agent and the solvent in the first embodiment, the waxes contained in the solid adhesive composition are dried when an applying part of the above solid adhesive is left to stand in the atmosphere to form a very fragile film (evaporation-inhibiting film), and this film prevents the solvent which is a volatile component contained in the solid adhesive composition from evaporating. On the other hand, the above film is broken by an applying pressure in applying to make applying of the adhesive composition possible. Furthermore, a required amount of the waxes contained in the solid adhesive composition is always present in the applying part, and therefore a new film is formed on the surface of the applying part with drying when the applying part is exposed to the atmosphere again. This cycle of film formation→applying→film formation→applying— produces repeatedly an effect many times. This makes the surface of the applying part less liable to be hardened when the applying part of the above solid adhesive is left to stand in the atmosphere for a long time to provide the excellent applying performance.

In the solid adhesive composition prepared by adding the substance forming an evaporation-inhibiting film to the solid adhesive composition comprising at least the adhesive component, the gelling agent and the solvent in the second embodiment, moisture contained in the atmosphere and/or the solid adhesive composition is absorbed in the substance forming an evaporation-inhibiting film when an applying part of the above solid adhesive is left to stand in the atmosphere; to be specific, the solvent evaporates from the surface of the solid adhesive, and heat is deprived in evaporation, so that a temperature on the surface is lowered; moisture contained in the atmosphere and/or the composition is deposited in the vicinity of the surface of the solid adhesive composition to form a very fragile film [liquid crystal surface film (evaporation-inhibiting film)] on the applying part (surface) as the composition in the vicinity of the surface changes; and this film prevents the solvent which is a volatile component contained in the solid adhesive composition from evaporating. On the other hand, the above film is broken by an applying pressure in applying to make applying of the adhesive composition possible. Further a required amount of the substance forming an evaporation-inhibiting film contained in the solid adhesive composition is always present in the applying part, and therefore when the applying part is exposed to the atmosphere again, moisture contained in the atmosphere and/or the solid adhesive composition is absorbed in the same manner as described above to form a new film on the surface of the applying part. This cycle of film formation→applying→film formation→applying—produces repeatedly an effect many times. This makes the surface of the applying part less liable to be hardened when the applying part of the solid adhesive is left to stand in the atmosphere for a long time to provide the excellent applying performance.

When moisture is contained in the solid adhesive composition, the effect is exhibited even when the humidity is low, but if it is too much, reduction in the adhesive performance is caused because of deterioration in the drying property.

In the solid adhesive composition prepared by adding various kinds of the waxes having the characteristic described above and various kinds of the substances forming an evaporation-inhibiting film described above to the solid adhesive composition comprising at least the adhesive component, the gelling agent and the solvent in the third embodiment, the waxes contained in the solid adhesive composition are dried, and moisture contained in the atmosphere and/or the solid adhesive composition is absorbed in the substance forming an evaporation-inhibiting film when an applying part of the above solid adhesive is left to stand in the atmosphere, whereby a very fragile composite film (evaporation-inhibiting composite film) is formed.

No theory on the embodiment of forming this composite film is established, but it is inferred that (1) a film formed by the waxes alone is a little imperfect, and fine pores are considered to be present on the above film; and the composite film is formed by filling up (forming a film) these fine pores with the evaporation-inhibiting substance or (2) a crystalline structure of the film becomes fine (minute) by blending the evaporation-inhibiting substance having a structure similar to those of the waxes (the above evaporation-inhibiting substance acts as a substance having action of enhancing fluidity), whereby the composite film is formed.

The solvent which is a volatile component contained in the solid adhesive composition is prevented from evaporating by this composite film more surely than in the solid adhesive composition in the first and second embodiments described above. The above composite film is broken by an applying pressure in applying to make applying of the adhesive composition possible. Furthermore the required amounts of the waxes and the substance forming an evaporation-inhibiting film contained in the solid adhesive composition are always present in the applying part, and therefore when the applying part is exposed to the atmosphere again, a new composite film is formed on the surface of the applying part. This cycle of composite film formation→applying→composite film formation→applying—produces repeatedly an effect many times. This makes the surface of the applying part less liable to be hardened when the applying part of the solid adhesive is left to stand in the atmosphere for a long time to provide more excellent applying performance.

The solid adhesive composition of the present invention is constituted in the manner described above but shall not be restricted to the embodiments described above, and other embodiments can be carried out with variety as long as they fall in the technical concept of the present invention.

For example, the kinds and the blending compositions of the adhesive component, the gelling agent and the solvent each described above can suitably be changed according to the uses of the solid adhesive composition, for example, a solid adhesive composition for office uses, a solid adhesive composition for garters and a solid pressure sensitive adhesive composition.

In the present invention, particularly when the solid adhesive composition of the present invention is applied to a screw-feeding vessel (stick type) equipped with a cap shown in FIG. 1 or a push-out vessel (not illustrated) equipped with a cap, the applying part is less liable to be hardened even when it is in the state that it is left to stand as it is without putting the cap thereon after applying, and the solid adhesive composition which has an excellent applying performance and which is excellent in a cap-off performance can be achieved.

EXAMPLES

Next, the present invention shall be explained in further details with reference to examples and comparative examples, but the present invention shall not be restricted to the following examples.

Examples 1 to 7 and Comparative Examples 1 to 3

The respective components were stirred and blended at 120° C. in formulations shown in the following Table 1 to prepare stick-shaped solid adhesive compositions.

A solubility of paraffin wax in a solvent (ethyl alcohol and propylene glycol monomethyl ether) was 0.01% at room temperature and that of hexaglycerin tristearate was 0.5%.

The respective solid adhesive compositions thus obtained were evaluated for adhesive performances based on a change with the passage of time and an initial adhesive performance by the following evaluation methods. The results thereof are shown in the following table 2.

Evaluation Method of Applying Performance

The applying performances of the solid adhesive compositions based on a change with the passage of time under an environment of 25° C./65% RH were evaluated according to the following evaluation criteria.

Evaluation Criteria

◎: can be applied by light touch
○: can be applied without blurring
Δ: blurred but can be applied
×: can not be applied at all Evaluation Method of Initial Adhesive Performance A test piece (3×6 cm) was adhered, and this test piece was peeled off after fixed time (one minute) to evaluate the degree of rupture of the paper according to the following evaluation criteria.

Evaluation Criteria

◎: paper rupture is caused
○: paper rupture is partially caused
Δ: adhered, but paper rupture is not caused
×: not adhered at all

TABLE 1

Solid adhesive composition

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Ethyl alcohol | 5.0 | 5.0 | 5.0 | 31.5 | 31.5 | 7.5 | 7.5 | 5.0 | 5.0 | 5.0 |
| Propylene glycol monomethyl ether | 45.5 | 40.5 | 55.49 | 10.00 | 5.0 | 48.97 | 51.4 | 55.5 | 45.5 | 45.5 |
| Sorbit.benzaldehyde condensation product *1 | 8.0 | 8.0 | 8.0 | 8.0 | 8.0 | — | — | 8.0 | 8.0 | 8.0 |
| Xylit.benzaldehyde condensation product | — | — | — | — | — | 10.0 | 10.0 | — | — | — |
| Polyvinylpyrrolidone K-90 *2 | 6.0 | 6.0 | 6.0 | 6.0 | 6.0 | 5.0 | 5.0 | 6.0 | 6.0 | 27.0 |
| Polyvinylpyrrolidone K-90 *3 | 25.0 | 25.0 | 25.0 | 39.0 | 39.0 | 25.0 | 25.0 | 25.0 | 25.0 | 4.0 |
| Perfume | 0.5 | 0.5 | 0.5 | 0.5 | 0.5 | 0.5 | 0.5 | 0.5 | 0.5 | 0.5 |
| Paraffin wax *4 | 10.0 | 15.0 | 0.01 | — | — | 3.0 | 0.3 | — | — | — |
| Hexaglycerin tristearate | — | — | — | 5.0 | 10.0 | 0.03 | 0.3 | — | — | — |
| Glycerin | — | — | — | — | — | — | — | — | 10.0 | 10.0 |
| Moisture content (%) in solid adhesive composition | 1.0 | 1.0 | 1.0 | 5.0 | 15.0 | 1.0 | 2.0 | 1.0 | 6.0 | 20.0 |

*1: gelation rate: 100%, "Gel All D" manufactured by New Japan Chemical Co., Ltd.
*2: average molecular weight: about 400,000, "PVP K-90" manufactured by I.S.P Co., Ltd.
*3: average molecular weight: about 40,000, "PVP K-30" manufactured by I.S.P Co., Ltd.
*4: melting point: 52 to 54° C., "Paraffin" manufactured by Wako Pure Chemical Industries, Ltd.

TABLE 2

|  | Evaluation of applying performance based on a change with the passage of time | | | | | | | | | Initial adhesive performance |
|---|---|---|---|---|---|---|---|---|---|---|
|  | 10 min | 1 hour | 3 hours | 6 hours | 12 hours | 1 day | 3 days | 5 days | 1 week | |
| Example 1 | ◎ | ◎ | ◎ | ◎ | ◎ | ◎ | ◎ | ○ | △ | ◎ |
| Example 2 | ◎ | ◎ | ◎ | ◎ | ◎ | ◎ | ◎ | ◎ | ○ | ◎ |
| Example 3 | ◎ | ◎ | ◎ | ◎ | ◎ | ◎ | ○ | △ | △ | ◎ |
| Example 4 | ◎ | ◎ | ◎ | ◎ | ◎ | ◎ | ◎ | ○ | △ | ○ |
| Example 5 | ◎ | ◎ | ◎ | ◎ | ◎ | ◎ | ◎ | ◎ | ○ | △ |
| Example 6 | ◎ | ◎ | ◎ | ◎ | ◎ | ◎ | ◎ | ◎ | ◎ | ◎ |
| Example 7 | ◎ | ◎ | ◎ | ◎ | ◎ | ◎ | ◎ | ◎ | ○ | ◎ |
| Comparative Example 1 | X | X |  |  |  |  |  |  |  | ◎ |
| Comparative Example 2 | ○ | △ | X |  |  |  |  |  |  | ○ |
| Comparative Example 3 | ◎ | ○ | X |  |  |  |  |  |  | X |

As apparent from the results shown in Table 1 and Table 2 described above, it has been found that the solid adhesive compositions prepared in Examples 1 to 7 falling in the scope of the present invention are excellent in an initial adhesive performance and have an excellent applying performance even after exposing the solid adhesive compositions to the atmosphere for a long time as compared with the solid adhesive compositions prepared in Comparative Examples 1 to 3 falling outside the scope of the present invention.

It has been found that in particular, the solid adhesive compositions prepared in Examples 6 and 7 in which the waxes were used in combination with the substance absorbing moisture contained at least in the atmosphere and/or the solid adhesive composition to form an evaporation-inhibiting film are further excellent in an initial adhesive performance and have an excellent applying performance even after exposing the solid adhesive compositions to the atmosphere for a long time (5 days or longer) as compared with the solid adhesive compositions prepared in Examples 1 to 5 in which the waxes were added alone or the substance forming an evaporation-inhibiting film was added alone.

In contrast with this, it has been found that in Comparative Examples 1 to 3 in which not used were the waxes and/or the substance absorbing moisture contained at least in the atmosphere and/or the solid adhesive composition to form an evaporation-inhibiting film, neither of the initial adhesive performance and the applying performance with the passage of time can be satisfied.

Industrial Applicability

According to the present invention, provided is a solid adhesive composition having an excellent applying performance even after the applying part is left to stand in the atmosphere for a long time, and it can be applied to an adhesive for office uses of a stick type, an adhesive for garters and a solid pressure sensitive adhesive.

What is claimed is:

1. A solid adhesive composition comprising at least an adhesive component, a gelling agent and a solvent, wherein contained in said composition is at least one selected from the group consisting of waxes which are a solid at room temperature and have a solubility of 20% or less in the solvent at room temperature.

2. A solid adhesive composition having an excellent cap-off performance, comprising at least an adhesive component, a gelling agent and a solvent, wherein contained in said composition is a substance absorbing moisture contained at least in the atmosphere and/or the adhesive composition to form an evaporation-inhibiting film.

3. A solid adhesive composition comprising at least an adhesive component, a gelling agent and a solvent, wherein contained in said composition are at least one selected from the group consisting of waxes which are a solid at room temperature and have a solubility of 20% or less in the solvent at room temperature and a substance absorbing moisture contained at least in the atmosphere and/or the adhesive composition to form an evaporation-inhibiting film.

4. The solid adhesive composition as described in claim 1, wherein the waxes which are a solid at room temperature and have a solubility of 20% or less in the solvent at room temperature are at least one selected from the group consisting of paraffin waxes, olefin waxes, microcrystalline waxes, petrolatum, animal waxes, vegetable waxes, mineral waxes, polyethylene waxes and Fisher-Tropsch waxes.

5. The solid adhesive composition as described in claim 3, wherein the waxes which are a solid at room temperature and have a solubility of 20% or less in the solvent at room temperature are at least one selected from the group consisting of paraffin waxes, olefin waxes, microcrystalline waxes, petrolatum, animal waxes, vegetable waxes, mineral waxes, polyethylene waxes and Fisher-Tropsch waxes.

6. The solid adhesive composition as described in claim 2, wherein the substance absorbing moisture contained at least in the atmosphere and/or the adhesive composition to form an evaporation-inhibiting film is at least one selected from the group consisting of glycerin fatty acid esters, polyglycerin fatty acid esters, alkyl phosphates, polyoxyalkylene fatty acid esters, sorbitan fatty acid esters, polyoxyalkylene sorbitan fatty acid esters, sorbit fatty acid esters, polyoxyalkylene sorbit fatty acid esters and lecithin.

7. The solid adhesive composition as described in claim 3, wherein the substance absorbing moisture contained at least in the atmosphere and/or the adhesive composition to form an evaporation-inhibiting film is at least one selected from the group consisting of glycerin fatty acid esters, polyglycerin fatty acid esters, alkyl phosphates, polyoxyalkylene fatty acid esters, sorbitan fatty acid esters, polyoxyalkylene sorbitan fatty acid esters, sorbit fatty acid esters, polyoxyalkylene sorbit fatty acid esters and lecithin.

8. The solid adhesive composition as described in claim 1, wherein the waxes are present in an amount of 0.1 to 15% by weight based on the total amount of the composition.

9. The solid adhesive composition as described in claim 4, wherein the waxes are present in an amount of 0.1 to 15% by weight based on the total amount of the composition.

10. The solid adhesive composition as described in claim 5, wherein the waxes are present in an amount of 0.1 to 15% by weight based on the total amount of the composition.

11. The solid adhesive composition as described in claim 2, wherein the substance absorbing moisture contained at least in the atmosphere and/or the adhesive composition to form an evaporation-inhibiting film is present in an amount of 0.01 to 10% by weight based on the total amount of the composition.

12. The solid adhesive composition as described in claim 6, wherein the substance absorbing moisture contained at least in the atmosphere and/or the adhesive composition to form an evaporation-inhibiting film is present in an amount of 0.01 to 10% by weight based on the total amount of the composition.

13. The solid adhesive composition as described in claim 7, wherein the substance absorbing moisture contained at least in the atmosphere and/or the adhesive composition to form an evaporation-inhibiting film is present in an amount of 0.01 to 10% by weight based on the total amount of the composition.

14. The solid adhesive composition as described in claim 3, wherein a content ratio of the waxes to the substance absorbing moisture contained at least in the atmosphere and/or the adhesive composition to form an evaporation-inhibiting film is 1/1 to 100/1 in terms of a weight ratio, and the total content thereof is 0.1 to 10% by weight based on the total amount of the composition.

15. The solid adhesive composition as described in claim 5, wherein a content ratio of the waxes to the substance absorbing moisture contained at least in the atmosphere and/or the adhesive composition to form an evaporation-inhibiting film is 1/1 to 100/1 in terms of a weight ratio, and the total content thereof is 0.1 to 10% by weight based on the total amount of the composition.

16. The solid adhesive composition as described in claim 7, wherein a content ratio of the waxes to the substance absorbing moisture contained at least in the atmosphere and/or the adhesive composition to form an evaporation-inhibiting film is 1/1 to 100/1 in terms of a weight ratio, and the total content thereof is 0.1 to 10% by weight based on the total amount of the composition.

* * * * *